(12) United States Patent
Getlin et al.

(10) Patent No.: US 8,046,778 B1
(45) Date of Patent: Oct. 25, 2011

(54) MANAGING DEVICE APPLICATION PROGRAM INTERFACES

(75) Inventors: Brent Getlin, Leander, TX (US); Rupen Chanda, San Francisco, CA (US); Rob Borcic, Pittsburg, CA (US)

(73) Assignee: Adobe Systems Incorporated, San Jose, CA (US)

( * ) Notice: Subject to any disclaimer, the term of this patent is extended or adjusted under 35 U.S.C. 154(b) by 871 days.

(21) Appl. No.: 11/945,170

(22) Filed: Nov. 26, 2007

(51) Int. Cl.
*G06F 13/00* (2006.01)
(52) U.S. Cl. ....................................................... 719/328
(58) Field of Classification Search ................... 719/328
See application file for complete search history.

(56) References Cited

U.S. PATENT DOCUMENTS

| | | | | |
|---|---|---|---|---|
| 5,327,558 | A * | 7/1994 | Burke et al. ....................... | 710/8 |
| 5,715,474 | A * | 2/1998 | Burke et al. ....................... | 710/6 |
| 6,289,382 | B1 | 9/2001 | Bowman-Amuah | |
| 6,725,456 | B1 * | 4/2004 | Bruno et al. .................. | 718/102 |
| 2003/0074487 | A1 * | 4/2003 | Akgul et al. ................... | 709/328 |
| 2007/0130331 | A1 | 6/2007 | Kao et al. | |
| 2009/0089785 | A1 * | 4/2009 | Marwinski et al. ........... | 718/102 |

OTHER PUBLICATIONS

Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.

* cited by examiner

*Primary Examiner* — Andy Ho
(74) *Attorney, Agent, or Firm* — Fish & Richardson P.C.

(57) ABSTRACT

A computer-implemented method includes identifying one or more application program interfaces from a group of application program interfaces for passing information between a scheduler, which is in communication with a virtual machine executed on a device, and a service provider of the device. The method also includes using the identified one or more application program interfaces to asynchronously pass information between the scheduler and the service provider of the device.

30 Claims, 6 Drawing Sheets

MANAGING DEVICE APPLICATION PROGRAM INTERFACES

BACKGROUND

The present disclosure relates to selecting from a collection of application program interfaces to exchange information and services between a virtual machine and various types of electronic devices.

Electronic devices such as cellular telephones and personal digital assistants (PDAs) may be used for presenting users with various types of content such as multimedia content that may include text, still images and video. Electronic devices may also provide user services such as providing access to electronic mail systems, browsing Internet sites and storing useful information (e.g., phone numbers, contact information, etc.). With the popularity and marketability of such devices, manufacturers are producing devices that offer a variety of different features and capabilities. For example, display screens with different sizes and resolution, audio decoders that comply with various decoding schemes and different types of storage formats may be incorporated or implemented into marketed devices. To access such device services and features (e.g., for multimedia presentations), interfaces are developed for the different types of devices.

SUMMARY

This specification describes technologies relating to selecting application program interfaces (API's) from a pool of API's to dynamically interface with a particular device. By providing a collection of API's with relatively generic functions, interfaces may be relatively quickly developed for a vast variety of electronic device to allow accessing device information and device services.

In general, in one aspect of the subject matter described in the specification can be embodied in a computer-implemented method that includes identifying one or more application program interfaces from a group of application program interfaces for passing information between a scheduler, which is in communication with a virtual machine executed on a device, and a service provider of the device. The method also includes using the identified one or more application program interfaces to asynchronously pass information between the scheduler and the service provider of the device. Other implementations of this aspect include corresponding systems, apparatus, and computer program products.

These and other embodiments can optionally include one or more of the following features. The identified one or more application program interfaces may be included in a subset of the group of application program interfaces, and, the subset may include at least one application program interface capable or incapable of interfacing with the service provider of the device. One application program interface incapable of interfacing with the service provider of the device may be capable of interfacing with a service provider of another device. The identified one or more application program interfaces may be included in a subset of the group of application program interfaces, and, the subset may include at least one application program interface capable of interfacing with the service provider of the device based upon a predefined condition.

The method may also include releasing the application program interface upon data passing completion. The passed information may include identification information of the device, operational information of the device, message information and other types of information. Various types of virtual machines may be implemented, such as a virtual machine that uses an embedded scripting language.

Particular implementations of the subject matter described in this specification can be implemented to realize one or more of the following advantages. By using a pool of selectable API's, device interfaces may be produced absent the time and cost of custom development efforts for each individual type and style of electronic device.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
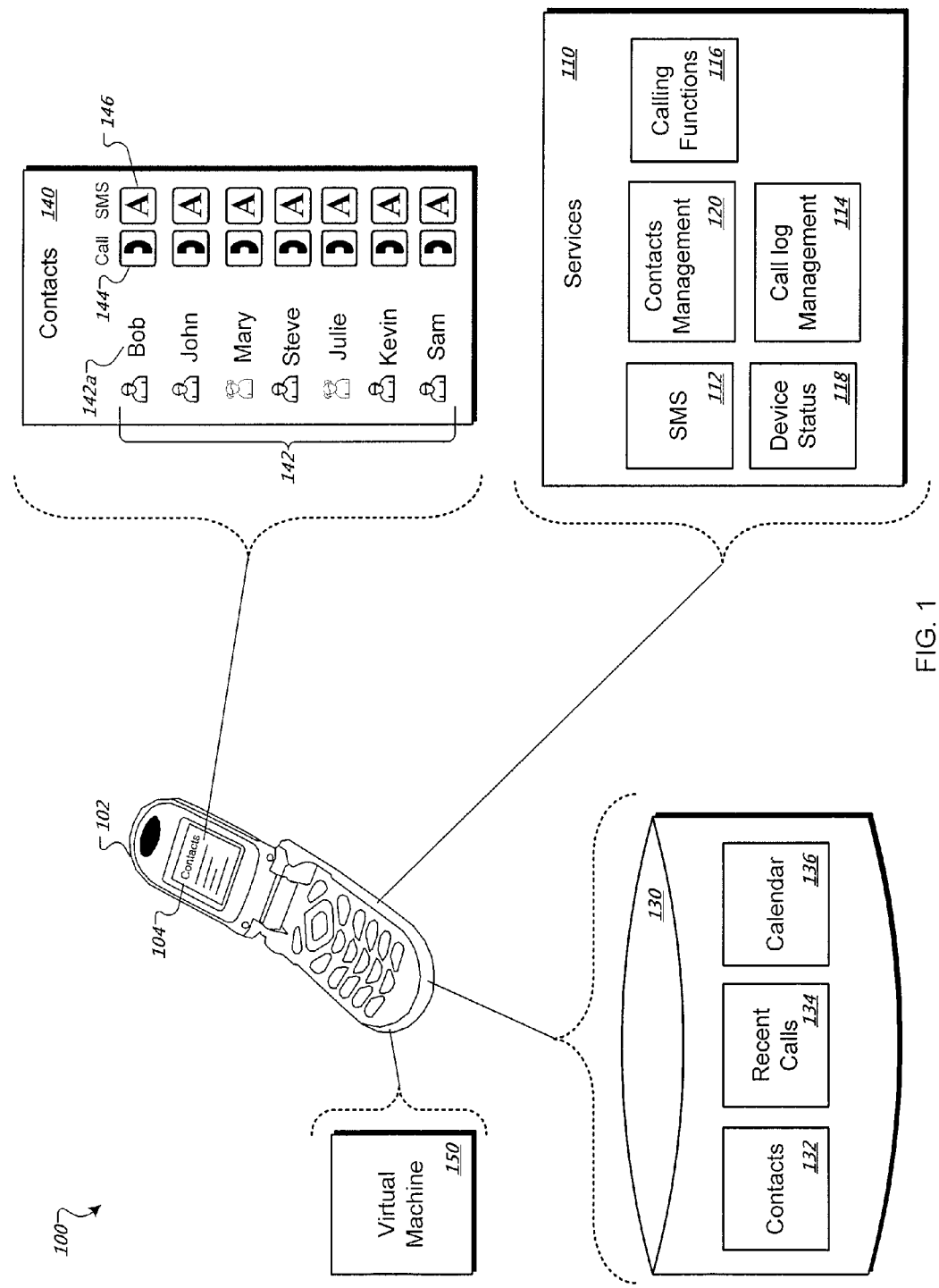
FIG. 1 illustrates an exemplary system for accessing information and services of a device.

Referring to FIG. 1, an example system 100 is illustrated for accessing data and services of a device 102. In some implementations, the device 102 is a mobile phone (e.g., a cellular telephone), smart phone, personal digital assistant (PDA), Blackberry device, laptop computer, Pocket PC, electronic gaming device, media player, personal computer, workstation, server or combinations of the like or other types of similar devices. The device 102 includes a display 104, which can be touch sensitive, and is integrated with the device 102 (or may be separate from the device). The device 102 can also include features such as integrated or separate speakers for audio reproduction, user input devices such as buttons, a keypad, a mouse or joystick and a microphone along with sensors such as one or more accelerometers for determining the orientation of the device 102.

The device 102 may provide one or more services 110 such as SMS (Short Message Service) services 112, call log management services 114, calling functions services 116, device status services 118 and contacts management services 120. These services may be provided by one or more processes that are stored (in memory) and executed within the device 102. The device 102 typically includes a storage device 130 such as a Subscriber Identity Module (SIM) card, flash memory, or the like that implements one or more types of storage techniques and methodologies. Various types of accessible information may be stored in the storage device 130, for example, contacts information 132, recent call information 134, and calendar information 136 along with other types of information.

The SMS services 112 may include, for example, services for sending and receiving messages and viewing previously received and sent messages. The call log management services 114 are associated with the logging of received and placed calls and include, for example, services for viewing and filtering call log entries. Call log entries, which can be included in the recent calls information 134, can include, for example, information for dialed calls, accepted calls, missed calls and rejected calls. The calling functions services 116 can include, for example, services for placing calls, receiving calls, presenting caller identity, and rejecting calls. The device status services 118 can include services for querying for system information or setting system preferences. For example, the device status services 118 can include services for querying signal strength, battery strength, charging status, SIM availability, operator name, cellular service provider name, roaming status, power mode, and default ring tone. The device status services 118 can also include, for example, services for setting a low battery threshold, backlight mode, power mode, and default ring tone. The contacts management services 120 can include, for example, services for interacting with the contact information 132, such as for viewing contacts, adding and removing contacts, and searching for contacts.

In this arrangement, the display 104 is capable of presenting a Graphical User Interface (GUI) 140 for displaying information and interacting with a user. The GUI 140 may display, for example, information from the contacts information 132. For example, a contact list 142 displays contact names and associated pictures. The GUI 140 can allow for a user to request services included in the services 110. For example, a button 144 allows a user to place a call to a contact 142a named "Bob". As another example, a button 146 allows a user to send a text message (i.e., SMS message) to the contact 142a. The GUI 104 can display other information, such as the recent calls information 134, or a calendar displaying calendar information 136.

The device 102 includes a virtual machine 150, such as the Adobe® Flash® Player available from Adobe Systems Incorporated (i.e., a virtual machine capable of using embedded scripting language such as ActionScript™), a Java Virtual Machine, or some other virtual machine. In this arrangement, the virtual machine 150 is executed on the device 102 and allows for programs to be executed that can create a rich user interface (e.g., the GUI 140) that allows access to device data (e.g., contacts information 132, recent calls information 134, calendar information 136, etc.) and device services (e.g., SMS services 112, call log management services 114, calling functions services 116, device status services 118, contacts management services 120, etc.). The virtual machine 150 may implement one or more techniques and methodologies for accessing information and services of the device 102. For example, a selection of API's may be used by the virtual machine 150 for accessing data and services of the device 102. For another type of device, another selection of API's may be identified and used to provide data and service access. Generally, an API provides a methodology prescribed by an operating system or by an application program by which another application such as a virtual machine can make requests of the operating system or the application. By selecting from a pool of API's, one or more selected groups of API's may be identified for use with at least one device type. Thus, one pool of API's can provide a source for selecting appropriate API's for a large variety of devices. Along with providing data and service accessibility, the virtual machine 150 coordinates the loading and execution of programs on the device 102.

Figure 2:
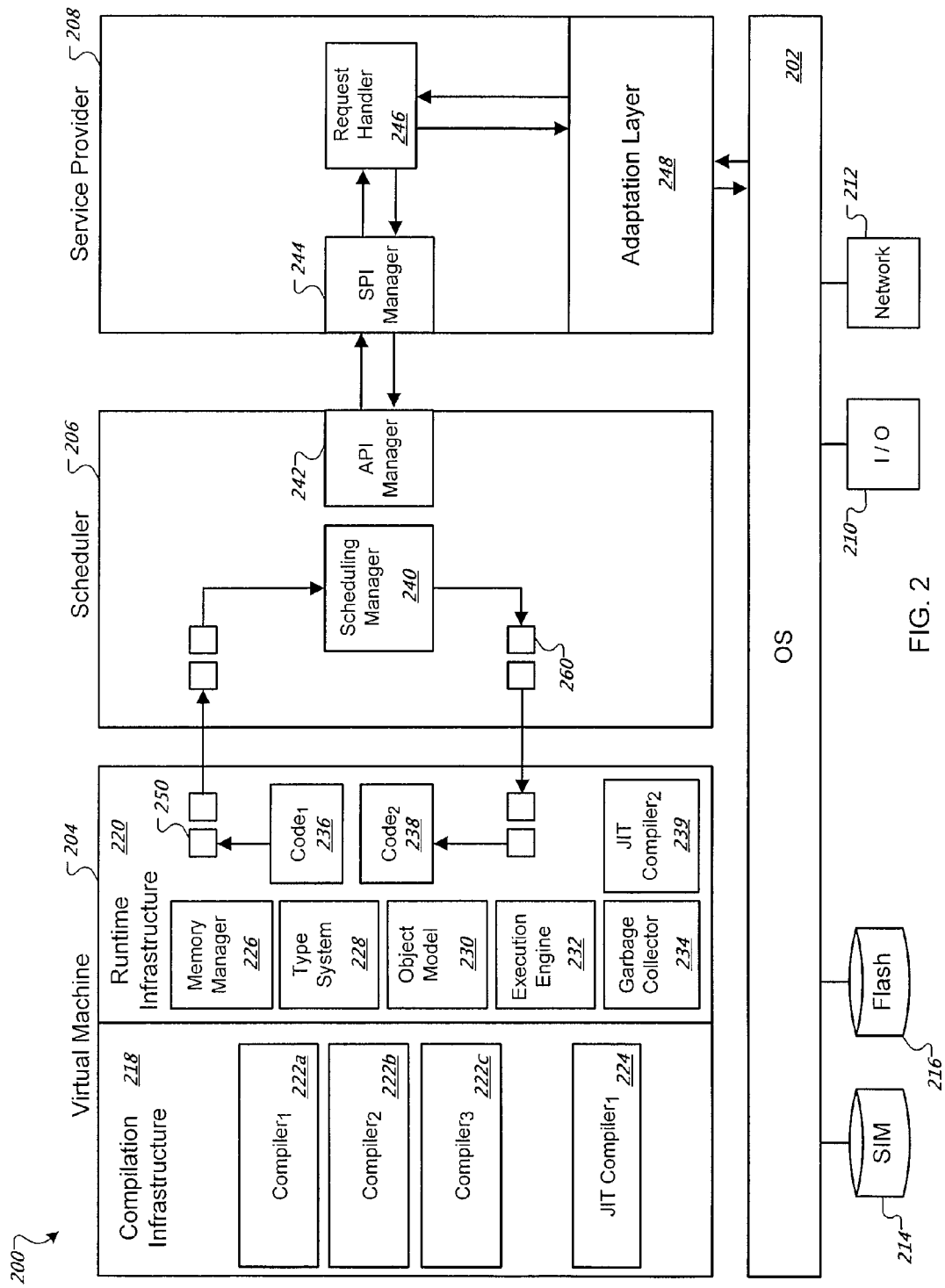
FIG. 2 illustrates an exemplary environment for submitting a request for accessing device information and services.

Referring to FIG. 2, an exemplary environment 200 is presented for accessing information and services of a device (e.g., a request is submitted for accessing device information and services). In this arrangement, the environment 200 includes an operating system (OS) 202 that is executed on a device (e.g., the device 102). For example, the OS 202 may be an operating such as the Symbian operating system (available from Symbian Software Limited, Redwood Shores, Calif.), the Binary Runtime Environment for Wireless (BREW) operating system (available from Qualcomm Incorporated of San Diego, Calif.). In general, the OS 202 manages and coordinates the hardware and software of the device upon which the OS 202 is executed. For example, the OS 202 can manage I/O (Input/Output) devices 210 (such as the display 104 (FIG. 1), a keypad, buttons, a mouse, and a joystick) along with managing one or more network connections 212 to one or more wired or wireless networks.

The OS 202 can enable programs to write information to persistent storage, such as a SIM card 214 and/or flash memory 216, for example, the SIM card 214 and/or the flash memory 216 may be used, for example, to store the contents of the storage device 130 (e.g., contacts information 132, recent calls information 134, and calendar information 136, etc.) shown in FIG. 1.

The environment 200 also includes a virtual machine 204 (e.g., the virtual machine 150), a scheduler 206 and a service provider 208, each of which is executed by the OS 202. In this arrangement, the virtual machine 204 includes a compilation infrastructure 218 and a runtime infrastructure 220. The compilation infrastructure 218 includes one or more compilers (e.g., compilers 222a-c) and a "Just In Time" (JIT) compiler 224 that compiles instructions that need to be interpreted (e.g., Java bytecode) into instructions that can be sent directly to a processor.

In this arrangement, the runtime infrastructure 220, which may be implemented as single-threaded or multi-threaded, includes a memory manager 226 that manages memory allocation and de-allocation (e.g., in heap memory and other data areas). The runtime infrastructure 220 also includes a type system 228 that tracks object types and object type hierarchies created and used by the system. The type system 228 can also store details of object structures and interfaces between objects in an object model 230. The runtime infrastructure 220 also includes an execution engine 232 that can load and execute programs in the virtual machine 204. A garbage collector 234 of the runtime infrastructure 220 identifies memory segments, which have not been referenced within a predefined time period, and indicates to executed programs that the memory segments are available. In some arrangements, the runtime infrastructure 220 may also provide additional functionality such as another JIT compiler 239 that is capable of compiling bytecode into machine executable code at runtime.

In this arrangement, the scheduler 206 includes a scheduling manager 240 that interfaces with the virtual machine 204 for exchanging data. The scheduler 206 also includes an API manager 242 that provides appropriate API's for interfacing with selected API's of a Service Provider Interface (SPI) 244 of the service provider 208 of the device. By selecting from a pool of API's, the SPI manager 244 determines the API's needed to interface with the service provider 208. Once selected, data (e.g., a request) may be passed from the scheduler 206 to a request handler 246 and an adaptation layer 248 included in the service provider 208.

Similar to the virtual machine 150 (shown in FIG. 1), the virtual machine 204 can be an ActionScript™ virtual machine, a Java virtual machine, or other similar type of virtual machine capable of compiling multiple source languages into the same intermediate language. For example, the compiler 222a may be capable of compiling Java source code into an intermediate bytecode, while the compiler 222b can compile ActionScript into the same intermediate bytecode, and the compiler 222c can compile C++ source code into the same intermediate bytecode. In this arrangement, the JIT compiler 224 can compile (e.g., before runtime) bytecode generated by one or more of the compilers 222a-c into machine executable code. As another example, the JIT compiler 239 can compile bytecode into machine executable code at runtime.

As an illustration of the virtual machine 204 requesting information from the service provider 208, an executable piece of code 236 (e.g., associated with a function, a method, a script, etc.) invokes the API manager 242, for example, to request information or services (e.g., to request recent call information). Based upon the API invocation by the executable code 236, a request message 250 is produced for delivery to the service provider 208. In this arrangement, as the request message 250 is processed, the executable code 236 continues execution and does not await the processing of the request message 250 (i.e., the request issued by the executed code 236 is processed in an asynchronous manner).

The request message 250 can be queued, or it can be sent to the scheduler manager 240 through one or more inter-process communication techniques or methodologies. In some implementations, the scheduler 206 and the virtual machine 204 may be executed by one process (e.g., as separate threads within a process), in which case, the message 250 may be communicated, for example, using a common data area.

The scheduling manager 240 manages incoming requests (e.g., request message 250), such as tracking the order of requests and tracking requests that have been serviced and still waiting service. In some arrangements, messages waiting servicing can be stored in a table, list, or some other type of data structure. The scheduling manager 240 may also monitor the service provider 208 to be aware when the service provider is capable of handling one or more requests.

Upon the scheduling manager 240 being ready to provide the request message 250 to the service provider 208, the API manager 242 provides one or more appropriate API's needed to pass the request message to one or more selected API's of the SPI manager 244 (of the service provider 208). In this arrangement, the API manager 242 communicates with the service provider 208 through the SPI manager 244 and the service provider 208 interacts with the OS 202 with the adaptation layer 248 to access device information and services of the device. In some arrangements, the service provider 208 may execute in a process separate from the scheduler 206, or, alternatively, the service provider 208 and scheduler 206 may execute in the same process (and, in some implementations, in the same process as the virtual machine 204). For example, the service provider 208 can be implemented in a dynamic link library (DLL) that linked to the scheduler 206.

Typically the one or more API's selected by the SPI manager 244 operate in an asynchronous manner, however in some implementations, one or more of the API's may operate in a synchronous manner. In one arrangement, in which the scheduler 206 and the service provider 208 are executed by the same process, for synchronous operation, a call from the API manager 242 to the SPI manager 244 may be a function or method call or other similar type of call. If, for example, the scheduler 206 and the service provider 208 are executed in separate processes, the call from the API manager 242 and the SPI manager 244 can be implemented using asynchronous message processing.

In general, the SPI manager 244 defines a set of API's that can be called for accessing device services or information. The one or more API's provided by the API manager 242 can provide the request message 250 to one or more API's of the SPI manager 244 (e.g., a single request message 250 from the virtual machine 204 can result in multiple calls to the SPI manager 244).

Calls to the SPI manager 244 can be forwarded to the request handler 246, which correspondingly interfaces with the adaptation layer 248. In this arrangement, the adaptation layer 248 is capable of interfacing with the OS 202 and may identify the OS along with OS features, for example, the adaptation layer 248 may identify the OS 202 as a BREW or Symbian OS. Furthermore, the adaptation layer 248 may be adjusted such that the service provider 208 is capable of supporting additional, new, and updated operating systems. For example, the adaptation layer 248 maybe adjusted such that the service provider 208 is capable to support a transition from a BREW operating system to a Symbian operating system.

Figure 3:
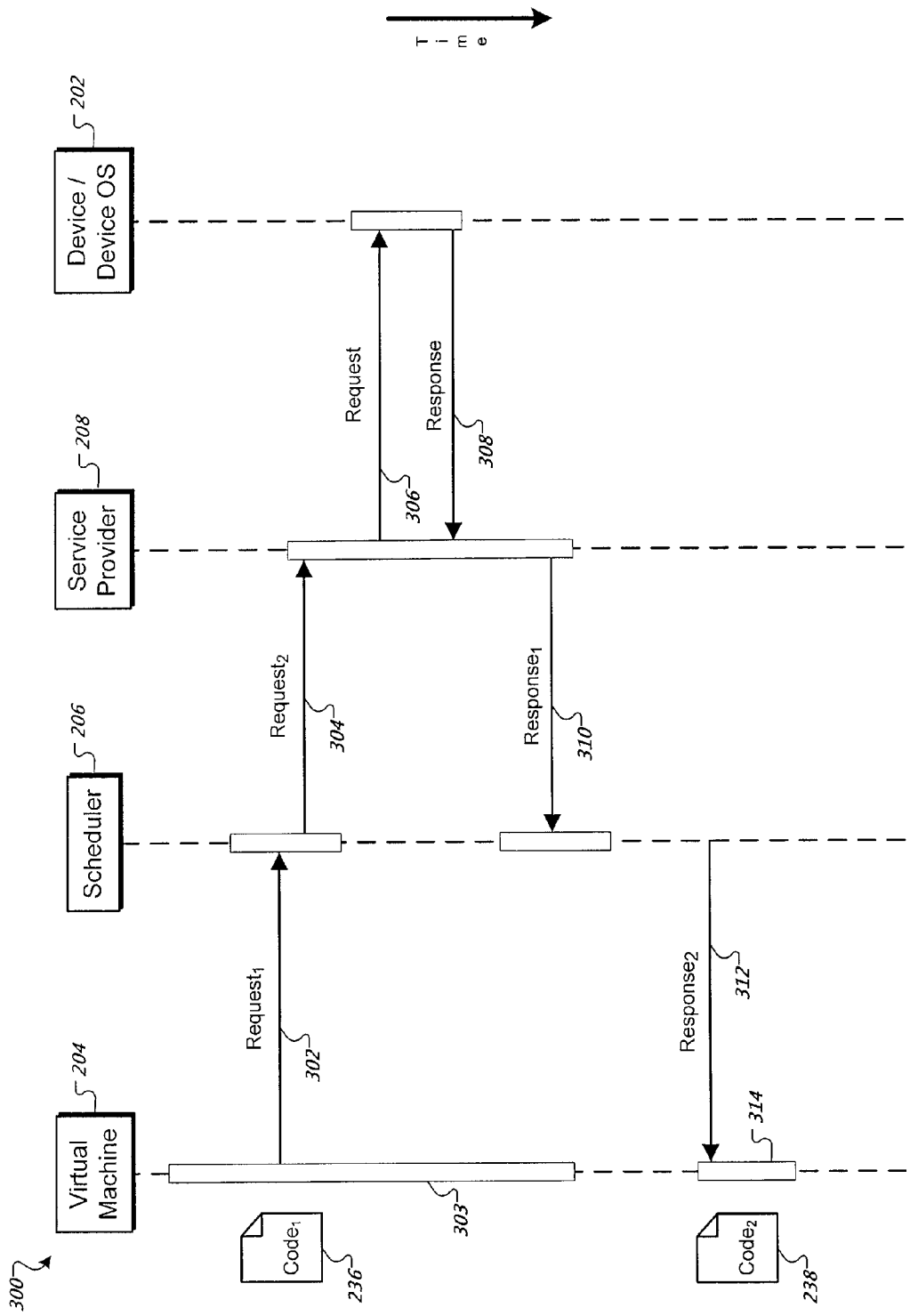
FIG. 3 illustrates an exemplary timeline of processing a request.

To pass a request service (e.g., place a call) or information request (e.g., call log information) that may be included in the request message 250, the adaptation layer 248 invokes operating system calls to access the appropriate device portion. Upon receiving one or more results from the OS 202 based upon the request (e.g., requested data or indication of service success or failure), the adaptation layer 248 provides the results to the scheduling manager 240 by way of an appropriately selected API included in the SPI manager 244. In some implementations the results are provided to the scheduling manager 240 in an asynchronous manner, however synchronous techniques may also be used. From the provided results, the scheduling manager 240 may prepare a response message 260 for passing along to the virtual machine 204. Upon receipt of the response message 260, the virtual machine 204 can invoke another portion of executable code 238 to process the response message 260. For example, the code 238 can present requested information such as a recent call list on the display 104 (FIG. 1). Referring to FIG. 3, a timeline is represented that illustrates a timeline 300 of a exchanging information between the virtual machine 204 and the service provider 208 (and in some implementations that OS 202 and the device) by way of one or more API's of the scheduler 204 and the service provider 208. Time progresses from the top of the figure to the bottom, as such, messages displayed near to the top of the figure occur before messages appearing nearer to the bottom of the page.

In this example, a request message 302 for device information or services is sent from the virtual machine 204 to the scheduler 206. For example, the executed code 236 can issue a request to access device services or information, such as to send a text message. The message 302 can correspond to the message 250 (see FIG. 2). When the service provider 208 is capable of processing requests, one or more appropriate API's submit the request message 302 to one or more API's of the SPI manager 244 of the service provider 208, and the executable code 236 continues processing, as indicated by the vertical bar 303.

In this example, the service provider 208 issues a request 306 to the OS 202 (e.g., by way of the adaptation layer 248 invoking an OS call). The OS 202 sends a response 308 to the service provider 208. The service provider 208 forwards the response 308 to the scheduler 206 by way of one or more appropriate API's as a response 310.

Correspondingly, the scheduler 206 forwards the response 310 to the virtual machine 204 as a response 312, which can, for example, correspond to the response message 260 (FIG. 2). In some implementations, the scheduler 206 may identify a function or routine (e.g., executable code 238) of the virtual machine 204 to process the response 312. For example, the request 302 can include content that identities a callback function (e.g., the identity of executable code 238), and the scheduler 206 match the request 302 to the response 310, identify the callback function identity, and include the callback function identity in the response 312 so that the virtual machine 204 can identify the function to execute for processing the response 312.

In other implementations, other portions of the environment 200 may identify functions for processing the response 312. For example, the virtual machine 204 can identify a callback function to process the response 312 by invoking callback routines to handle the response.

In this illustration, a vertical bar 314 represents the executable code 238 processing the response 312, such as processing received device information or verifying that a requested service been successfully completed.

Figure 4:
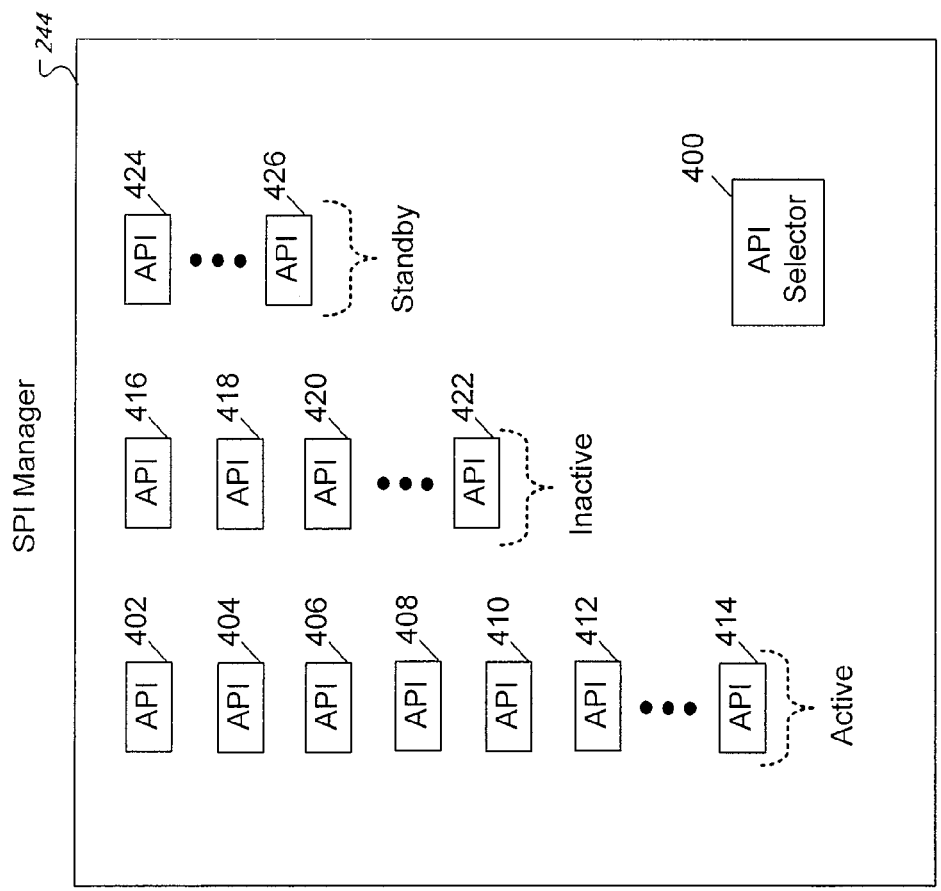
FIG. 4 illustrates an exemplary service provider interface manager.

Referring to FIG. 4, the SPI manager 244 may include a considerable number of API's that provide specific functionality for interfacing with the device upon which the SPI manager resides. For example, the API's may be used for selectively handling various types of requests and information sharing with the device. By using API's that provide discrete and generic functions, a wide variety of devices may be interfaced with the API's and the SPI manager 244. Furthermore, by implementing API's with discrete functionality, relatively small adjustments to one or more portion of API code may be needed for interfacing with many different devices (e.g., various styles and types of cellular telephones produced by different manufactures) and service providers associated with the devices.

Along with being capable of interfacing with services providers of various devices, the API's may send and receive data in a unidirectional and a bi-directional manner. For example, one or more API's may send or receive information from a service provider (e.g., service provide 208), and in some implementations one or more API's may be capable of sending and receiving service provider information. Furthermore, while some API's may operate in isolation, in some implementations two or more API's may function in concert.

Various types of functionality may be provided by the API's (included in the SPI manager 244) for handling a variety of tasks. For example, some API's may be associated with collecting information associated with the device such as identification information (e.g., manufacturer, device model, device capabilities, etc.), operational information (e.g., device battery level, signal strength, device charging status, etc.), message and electronic messaging information (e.g., portions of e-mail and SMS messages, message date and time sent and received, send and recipient contact information, etc.) and other types of device information (e.g., telephone call logs, etc.).

In some arrangements, one or more of the API's may also operate in an asynchronous manner such that other operations may be executed in parallel with the API. For example, one API may be used for a particular transaction between the scheduler 206 and the service provider 208. In response to the transaction being initiated, status data (e.g., a cookie) may be produced such that execution of the transaction may be tracked as other operations are executed. Upon completion of the transaction, the status data may be updated to reflect the completion and to release the API for use with other operations. As such, the environment 200 may be capable of operating in multi-threaded devices, devices with multiple processors, near real-time systems, etc. One or more of the API's may be capable of operating in a synchronous mode such that a task is executed and completed by an API prior to other operations being initiated.

To this particular arrangement, the SPI manger 244 includes an API selector 400 that is capable of selecting API's for use with interfacing with the device in which the SPI manager is located. For example, for a cellular telephone, the API selector 400 may select API's associated with generic functions that may be needed to exchange information with this particular type of device. Such API's may be identified as active by the API selector 400 while API's that are not capable of functioning with the cellular telephone (or other similar device) may be identified as inactive. In some arrangements, the API selector 400 may also identify one or more classes of API's, for example, some API's may only be capable of interfacing with the device under particular conditions and situations. For example, one or more API's may only be capable of interfacing with the cellular telephone during the time periods with the device is powering-up or powering-down. Such API's may be identified by the API selector 400 as being standby API's, which may become active during some events or time periods and inactive during other events or time periods.

In this illustration the SPI manager 244 includes a considerable number of API's (e.g., fifty, eighty, one hundred, etc.) and the API selector 400 has identified one group of the API's as active (e.g., API's 402-414), another API group as inactive (e.g., API's 416-422) and a third API group as being standby API's (e.g., API's 424-426). Along with selecting appropriate API's dependent upon the device in which API manager 242 resides, the API selector 400 may also dynamically select and adjust API selections. For example, the device may be capable of being placed in one or more different modes and transitioning from one mode to another mode may trigger the API selector 400 to adjust one or more API's so that an appropriate interface is maintained.

Figure 5:
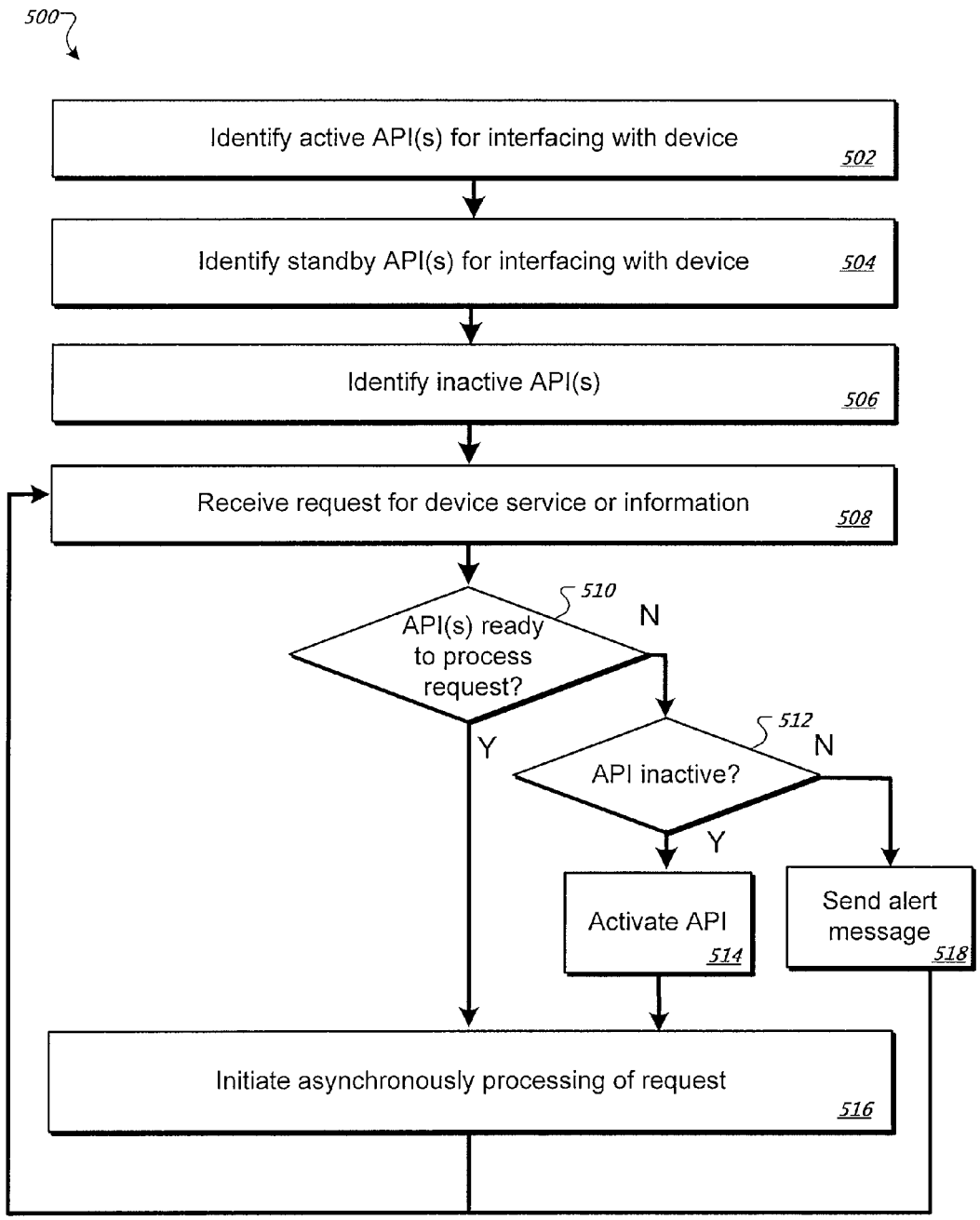
FIG. 5 is a flowchart that represents operations of an exemplary API selector.

Referring to FIG. 5, a flowchart 500 represents a particular arrangement of operations of the API selector 400. Typically the operations are executed by a processor present in a device (e.g., a cellular telephone) upon which the API selector resides, however, the operations may also be executed by multiple processors present in the device. While typically executed by a single device, in some arrangements, operation execution may be distributed among two or more devices.

Operations include identifying 502 one or more API's (from a pool of API's) that are capable of actively interfacing with the device upon which the API selector 400 is located. Operations may also include identifying 504 API's included in the pool of API's that are capable of interfacing with the device during particular conditions (referred to as standby API's). API's included in the API pool that are not capable of interfacing with the particular device (in which the API manager is located) may also be identified 506 by some operations (and referred to as inactive API's), however, in some arrangements such inactive API's may not be identified.

Operations may also include receiving 508 a request for information or one or more services of the device. Upon receiving the request, the API selector 400 may determine 510 the API or API's (from the active and standby API's) needed to interface with the device for providing the requested service or information. If the needed API or API's are not identified as active or standby API's, the API manager determines 512 if the needed API or API's have been identified as inactive. If inactive, the one or more needed API's can be activated 514 and asynchronous processing of the request is initiated 516, however, in some arrangements, the synchronous processing of the request may be initiated. In some implementations, one or more API's may be selected for use as a request is received. As such, an appropriate API or API's may be activated for asynchronous (or synchronous processing) based upon a received request.

Operations may also include sending 518 an alert if one or more API's needed to process the request are not present in the API pool. Such an alert may include presenting a message (e.g., a graphical message, an audible tone, etc.) to the device user or by implementing one or more similar alert techniques or methodologies. The API selector 400 may also return to receive another request upon sending 518 the alert or initiating 516 the asynchronous processing of the previously received request.

Figure 6:
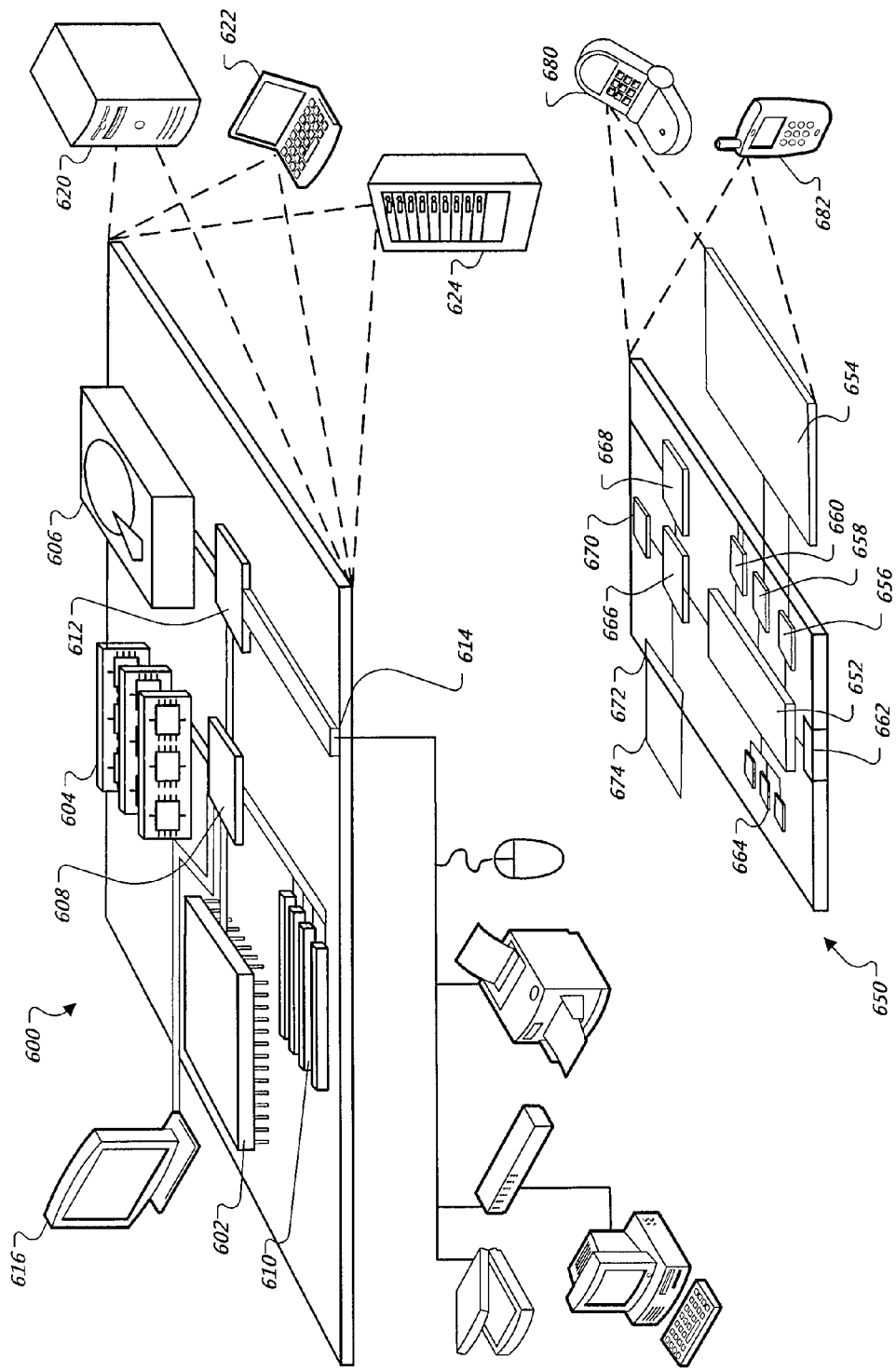
FIG. 6 is a block diagram of exemplary computing devices.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. The storage device 606 can, for example, store the device information 130.

In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method comprising:
    identifying at least one application program interface from a group of application program interfaces for passing information between a scheduler, which is in communication with a virtual machine executed on a device, and a service provider of the device; and
    using the identified at least one application program interface to asynchronously pass information between the scheduler and the service provider of the device.

2. The computer-implemented method of claim 1, in which the identified at least one application program interface is included in a subset of the group of application program interfaces, in which the subset includes at least one application program interface capable of interfacing with the service provider of the device.

3. The computer-implemented method of claim 1, in which the identified at least one application program interface is included in a subset of the group of application program interfaces, in which the subset includes at least one application program interface incapable of interfacing with the service provider of the device.

4. The computer-implemented method of claim 3, in which the at least one application program interface incapable of interfacing with the service provider of the device is capable of interfacing with a service provider of another device.

5. The computer-implemented method of claim 1, in which the identified at least one application program interface is included in a subset of the group of application program interfaces, in which the subset includes at least one application program interface capable of interfacing with the service provider of the device based upon a predefined condition.

6. The computer-implemented method of claim 1, further comprising:
    releasing the application program interface upon data passing completion.

7. The computer-implemented method of claim 1, in which the information includes identification information of the device.

8. The computer-implemented method of claim 1, in which the information includes operational information of the device.

9. The computer-implemented method of claim 1, in which the information includes message information.

10. The computer-implemented method of claim 1, in which the virtual machine uses an embedded scripting language.

11. A system comprising:
    an application program interface selector for identifying at least one application program interface from a group of application program interfaces for passing information between a scheduler, which is in communication with a virtual machine executed on a device, and a service provider of the device; and
    a service provider interface manager for initiating use of the identified at least one application program interface to asynchronously pass information between the scheduler and the service provider of the device.

12. The system of claim 11, in which the identified at least one application program interface is included in a subset of the group of application program interfaces, in which the subset includes at least one application program interface capable of interfacing with the service provider of the device.

13. The system of claim 11, in which the identified at least one application program interface is included in a subset of the group of application program interfaces, in which the subset includes at least one application program interface incapable of interfacing with the service provider of the device.

14. The system of claim 13, in which the at least one application program interface incapable of interfacing with the service provider of the device is capable of interfacing with a service provider of another device.

15. The system of claim 11, in which the identified at least one application program interface is included in a subset of the group of application program interfaces, in which the subset includes at least one application program interface capable of interfacing with the service provider of the device based upon a predefined condition.

16. The system of claim 11, in which the identified application program interface may be released upon data passing completion.

17. The system of claim 11, in which the information includes identification information of the device.

18. The system of claim 11, in which the information includes operational information of the device.

19. The system of claim 11, in which the information includes message information.

20. The system of claim 11, in which the virtual machine uses an embedded scripting language.

21. A computer program product, encoded on a computer-readable storage device, operable to cause data processing apparatus to perform operations comprising:
    identifying at least one application program interface from a group of application program interfaces for passing information between a scheduler, which is in communication with a virtual machine executed on a device, and a service provider of the device; and
    using the identified at least one application program interface to asynchronously pass information between the scheduler and the service provider of the device.

22. The computer program product of claim 21, in which the identified at least one application program interface is included in a subset of the group of application program interfaces, in which the subset includes at least one application program interface capable of interfacing with the service provider of the device.

23. The computer program product of claim 21, in which the identified at least one application program interface is included in a subset of the group of application program interfaces, in which the subset includes at least one application program interface incapable of interfacing with the service provider of the device.

24. The computer program product of claim 23, in which the at least one application program interface incapable of interfacing with the service provider of the device is capable of interfacing with a service provider of another device.

25. The computer program product of claim 21, in which the identified at least one application program interface is included in a subset of the group of application program interfaces, in which the subset includes at least one application program interface capable of interfacing with the service provider of the device based upon a predefined condition.

26. The computer program product of claim 21, further operable to cause data processing apparatus to perform operations comprising:
    releasing the application program interface upon data passing completion.

27. The computer program product of claim 21, in which the information includes identification information of the device.

28. The computer program product of claim 21, in which the information includes operational information of the device.

29. The computer program product of claim 21, in which the information includes message information.

30. The computer program product of claim 21, in which the virtual machine uses an embedded scripting language.

* * * * *